United States Patent
Ovsiannikov (10) Patent No.: US 7,773,805 B2
(45) Date of Patent: Aug. 10, 2010

(54) METHOD AND APPARATUS FOR FLARE CANCELLATION FOR IMAGE CONTRAST RESTORATION

(75) Inventor: Ilia Ovsiannikov, Studio City, CA (US)

(73) Assignee: Aptina Imaging Corporation, Grand Cayman (KY)

( * ) Notice: Subject to any disclaimer, the term of this patent is extended or adjusted under 35 U.S.C. 154(b) by 1194 days.

(21) Appl. No.: 11/320,808

(22) Filed: Dec. 30, 2005

(65) Prior Publication Data

US 2007/0154109 A1    Jul. 5, 2007

(51) Int. Cl.
*G06K 9/00* (2006.01)
*G06K 9/24* (2006.01)
*H04N 9/73* (2006.01)

(52) U.S. Cl. ................. 382/168; 382/274; 348/223.1

(58) Field of Classification Search ................. 382/167, 382/168, 172, 254, 255, 274, 275, 312, 162; 348/223.1, 224.1, 230.1, 243–252, 688
See application file for complete search history.

(56) References Cited

U.S. PATENT DOCUMENTS

| | | | | |
|---|---|---|---|---|
| 5,280,354 A | * | 1/1994 | Nakamura | 348/688 |
| 6,580,825 B2 | * | 6/2003 | Bhaskar | 382/169 |
| 6,912,321 B2 | * | 6/2005 | Gindele | 382/274 |
| 7,064,785 B2 | * | 6/2006 | Prentice et al. | 348/243 |
| 7,139,426 B2 | * | 11/2006 | Ivers et al. | 382/169 |
| 7,173,663 B2 | * | 2/2007 | Skow et al. | 348/364 |
| 7,236,190 B2 | * | 6/2007 | Yanof et al. | 348/222.1 |
| 7,362,354 B2 | * | 4/2008 | Lin | 348/222.1 |

* cited by examiner

*Primary Examiner*—Kanji Patel
(74) *Attorney, Agent, or Firm*—Dickstein Shapiro LLP (57) ABSTRACT

A system and method for flare cancellation and image contrast restoration includes generating a histogram of pixel response values of pixels of an image and generating an adjustment signal having a luminance adjustment value responsive to the histogram. The system and method also includes adjusting the pixel response values of pixels of the image responsive to the adjustment signal to produce an adjusted image.

20 Claims, 6 Drawing Sheets

METHOD AND APPARATUS FOR FLARE CANCELLATION FOR IMAGE CONTRAST RESTORATION

FIELD OF THE INVENTION

The present invention relates to a method, system, circuit and program carrier for the cancellation of flare and restoration of contrast in digital images.

BACKGROUND OF THE INVENTION

Image sensors are used in a variety of digital image capture systems, including products such as scanners, copiers, and digital cameras. The image sensor is typically composed of an array of light-sensitive pixel cells that are electrically responsive to incident light reflected from an object or scene whose image is to be captured.

For example, a CMOS imager includes a focal plane array of pixel cells, each cell includes a photosensor, for example, a photogate, photoconductor or a photodiode overlying a substrate for producing a photo-generated charge in a doped region of the substrate. In a CMOS imager, the active elements of a pixel cell, for example a four transistor (4T) pixel cell, perform the necessary functions of (1) photon to charge conversion; (2) resetting a floating diffusion region to a known state; (3) transfer of charge to the floating diffusion region; (4) selection of a pixel cell for readout; and (5) output and amplification of a signal representing a reset voltage and a pixel signal voltage based on the photo-converted charges. The charge at the floating diffusion region is converted to a pixel or reset output voltage by a source follower output transistor.

Exemplary CMOS imaging circuits, processing steps thereof, and detailed descriptions of the functions of various CMOS elements of an imaging circuit are described, for example, in U.S. Pat. Nos. 6,140,630, 6,376,868, 6,310,366, 6,326,652, 6,204,524 and 6,333,205, all assigned to Micron Technology, Inc. The disclosures of each of the forgoing patents are hereby incorporated by reference herein in their entirety.

Figure 1:
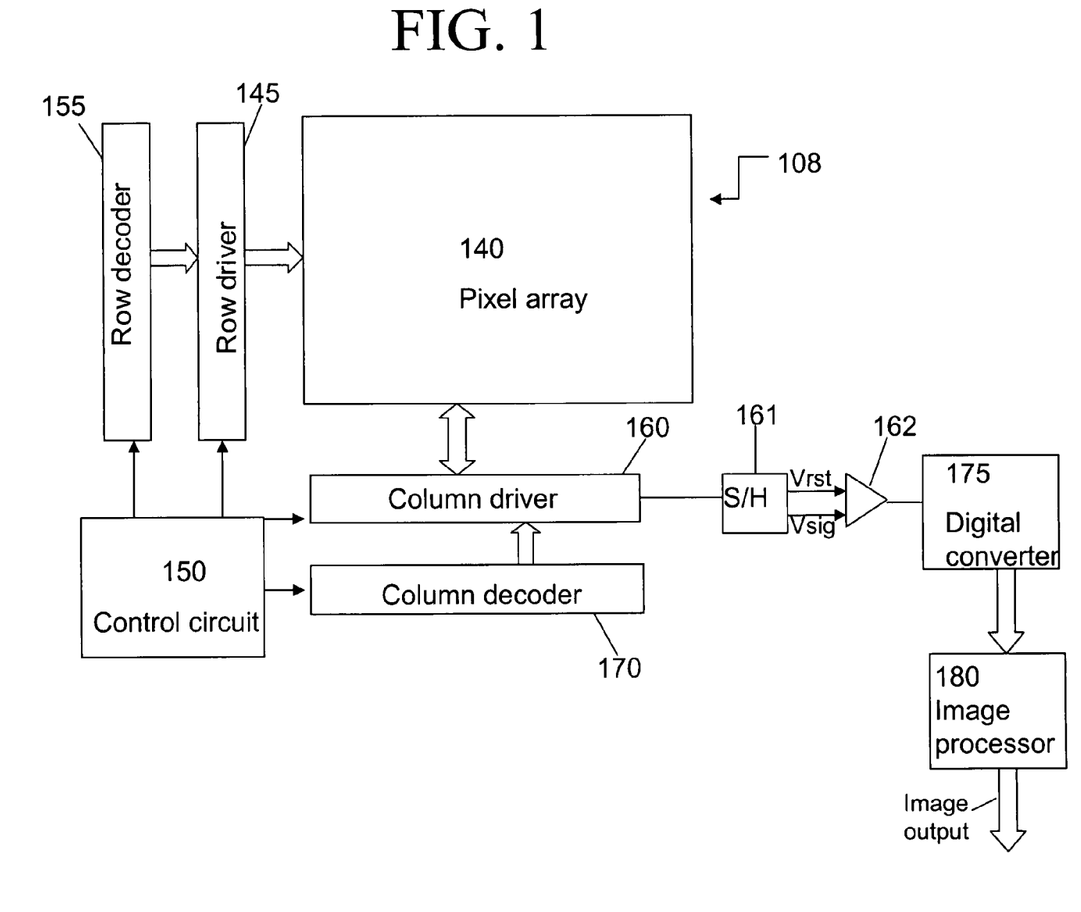
FIG. 1 depicts a block diagram of an imaging device which can employ the invention.

FIG. 1 illustrates a block diagram of one exemplary CMOS imager 108 having a pixel array 140 comprising a plurality of pixel cells arranged in a predetermined number of columns and rows, with each pixel cell being constructed as illustrated and described above. Electrically connected to the array 140 is signal processing circuitry for controlling the pixel array 140, as described herein. The pixel cells of each row in array 140 are all turned on at the same time by a row select line (not shown), and the pixel cells of each column are selectively output by respective column select lines. The row lines are selectively activated by a row driver 145 in response to row address decoder 155. The column select lines are selectively activated by a column driver 160 in response to column address decoder 170. Thus, a row and column address is provided for each pixel cell.

The CMOS imager 108 is operated by a timing and control circuit 150, which controls address decoders 155, 170 for selecting the appropriate row and column lines for pixel readout. The control circuit 150 also controls the row and column driver circuitry 145, 160 such that they apply driving voltages to the drive transistors of the selected row and column lines. The pixel column signals, which typically include a pixel reset signal $V_{rst}$ and a pixel image signal $V_{sig}$, are output to column driver 160, on output lines, and are read by a sample and hold circuit 161. $V_{rst}$ represents a reset state of a pixel cell. $V_{sig}$ represents the amount of charges generated by the photosensitive element of a pixel cell in response to applied light during an integration period. A differential signal ($V_{rst}$-$V_{sig}$) is produced by differential amplifier 162 for each readout pixel cell. The differential signal is digitized by an analog-to-digital converter 175 (ADC). The analog-to-digital converter 175 supplies the digitized pixel signals to an image processor 180, which forms and outputs a digital image.

Under certain image capture conditions, an excess of white light, known as flare, can cause a captured image to have a low contrast or appear washed out. Flare can appear in images captured by any image sensor or scanner. Common sources of flare are internal reflections in low-quality lenses, the presence of dust in an optical system, and foggy environmental conditions. Flare can affect some or all of the captured image. In many cases, images exhibiting flare do not contain any deep black tones anywhere in the image, which is undesirable.

Thus, there exists a need and desire for an improved imager system and post-capture processing technique which can mitigate against image flare.

BRIEF SUMMARY OF THE INVENTION

The present invention relates to a system and method for flare cancellation and image contrast restoration, and a program carrier which carries a program capable of implementing the method on a computer, such as a microprocessor. The invention generates a pixel response histogram from a captured image which is used to provide adjusted signals for the image which are applied to the image to reduce flare and provide an output image with enhanced image contrast.

BRIEF DESCRIPTION OF THE DRAWINGS

The above-described features of the invention will be more clearly understood from the following detailed description, which is provided with reference to the accompanying drawings in which.

DETAILED DESCRIPTION OF THE INVENTION

In the following detailed description, reference is made to the accompanying drawings, which form a part hereof and show by way of illustration specific embodiments in which the invention may be practiced. These embodiments are described in sufficient detail to enable those skilled in the art to practice the invention, and it is to be understood that other embodiments may be utilized, and that structural, logical, and electrical changes may be made without departing from the spirit and scope of the present invention. The progression of processing steps described is exemplary of embodiments of the invention; however, the sequence of steps is not limited to that set forth herein and may be changed as is known in the art, with the exception of steps necessarily occurring in a certain order.

The inventors have determined that, in cases where flare affects the entire image, the contribution of flare can be estimated by the presence or absence of deep black tones in the image. In general, flare can be subtracted out of the image to restore to proper contrast.

According to an exemplary embodiment of the invention, each pixel of an image is processed in a grayscale space to have a pixel output value as follows:

$$P_{out} = \frac{(P_{in} - F)}{(K - F)} \quad (1)$$

where $P_{in}$ represents the pixel response value (e.g., on a scale of 0 to 255) of a pixel of the input image, $P_{out}$ is the pixel response value for the pixel of the output image, K is an empirical constant representing a maximum possible pixel response value (e.g., 255 on a scale of 0 to 255) and F is the estimated flare value, discussed below, for each pixel.

According to another exemplary embodiment of the present invention, each pixel can be processed in an RGB space to have pixel output RGB components determined as follows:

$$R_{out} = \frac{(R_{in} - R_f)}{(K - R_f)} \quad (2)$$

$$G_{out} = \frac{(G_{in} - G_f)}{(K - G_f)} \quad (3)$$

$$B_{out} = \frac{(B_{in} - B_f)}{(K - B_f)} \quad (4)$$

where $R_{in}$, $G_{in}$ and $B_{in}$ are the RGB, i.e., red, green and blue pixel response values (on a scale of 0 to 255) for respective pixels of the input image, $R_{out}$, $G_{out}$ and $B_{out}$ are RGB pixel response values for the respective pixels of the output image, and $R_f$, $G_f$ and $B_f$ are the estimated flare value, discussed below, for each respective pixel. In most instances, flare is the result of white light; therefore the RGB flare values can be simplified to $$R_f = G_f = B_f = F \quad (5)$$

Therefore, each pixel in this embodiment may be processed to provide pixel output RGB components as follows:

$$R_{out} = \frac{(R_{in} - F)}{(K - F)} \quad (6)$$

$$G_{out} = \frac{(G_{in} - F)}{(K - F)} \quad (7)$$

$$B_{out} = \frac{(B_{in} - F)}{(K - F)} \quad (8)$$

Therefore, by accurately calculating the contribution of flare F in a captured image, contrast levels can be restored to their proper values during image processing. The divisor ensures that true whites are not inadvertently darkened by the image processing. Similar cancellation can also be performed in other color spaces, including but not limited to XYZ, xyZ, Lab and Luv.

If flare cancellation is carried out in an RGB color space as described above, we can also plot a histogram of RGB values, all combined together into one histogram. For the simplicity of implementation it is also possible to use a histogram made of the minimum value of pixel's RGB triplet, min(Rij,Gij, Bij).

To plot a histogram of combined RGB values, the input RGB data can be pre-corrected for white point, i.e., the RGB channels are individually pre-gained so that values of $R_f$, $G_f$ and $B_f$ correspond to a shade of gray. As discussed above, because flare typically manifests itself as white light added into the image, $R_f$, $G_f$ and $B_f$ will typically be equal to the same corresponding shade of gray. Thus, subtracting F from each of RGB channels equals to subtracting off the gray pedestal created by flare.

Secondly, the data must not be color corrected prior to flare cancellation. In the image processing sequence the color correction should be done after flare cancellation, as discussed in the embodiment of FIG. 5B.

Figure 2A:
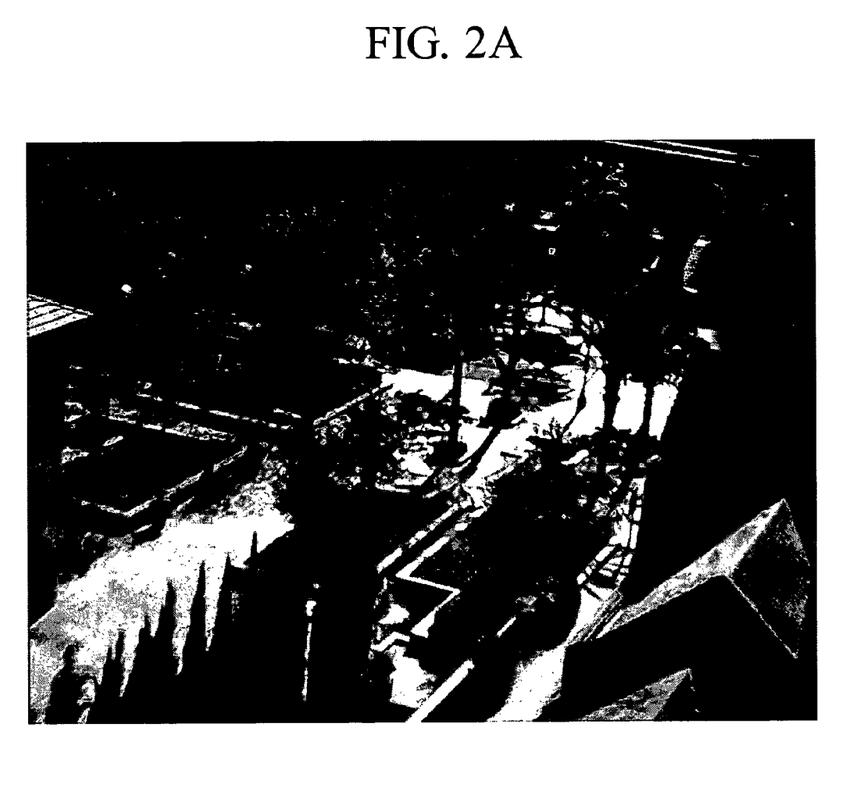
FIG. 2A is an exemplary image exhibiting a correct exposure level and correct contrast levels.
Figure 2B:
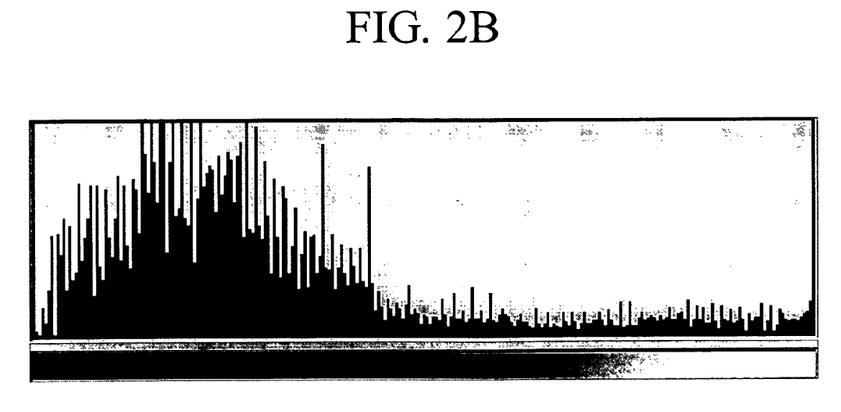
FIG. 2B is a histogram of the exemplary image of FIG. 2A.

Referring now to the drawings, FIG. 2A illustrates an exemplary image having correct white balance and contrast levels. A histogram of the exemplary image, shown in FIG. 2B, plots the number of pixels in the exemplary image corresponding to each pixel response value, on a scale of 0 to 255. Because there is an abundance of deep black tones, represented by pixel response values in the histogram extending all the way to the left (black side) of the histogram, no flare correction is necessary for the FIG. 2A image.

Figure 3A:
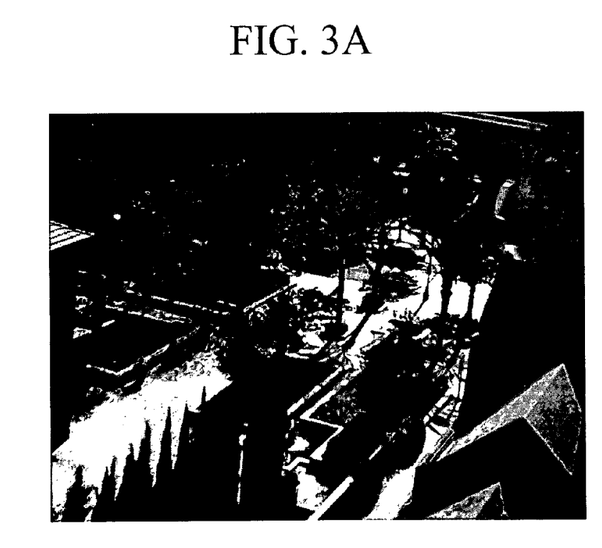
FIG. 3A is an exemplary image which has not been corrected for flare according to the present invention.
Figure 3B:
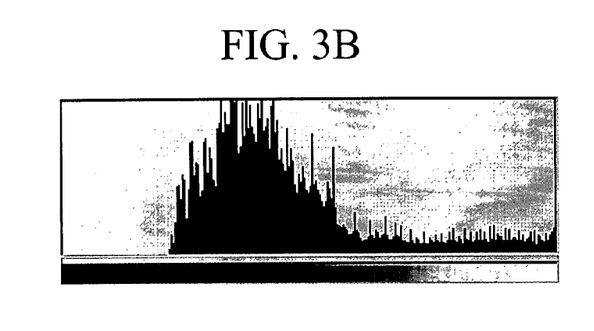
FIG. 3B is a histogram of the exemplary image of FIG. 3A.

Referring now to FIG. 3A, the same exemplary image is shown, but with a lower contrast and increased white levels due to flare. The histogram of pixel response values shown in FIG. 3B shows a lack of pixels having low pixel response values, i.e., a very low pixel count on the black side of the histogram. Therefore, the image lacks deep black tones, indicating an overabundance of white levels in the image. This overabundance of white levels can be corrected for by determining a threshold pixel response value $F_H$, equal to the lowest pixel response value in the histogram with a non-zero pixel count.

Alternatively, the threshold value $F_H$ may be the lowest pixel response value with a pixel count above any set number, e.g., 10 pixels. Some images may have a small, but negligible number of pixels having low pixel response values, e.g., individual dark pixels caused by the contributions of noise, pixel malfunction, etc. By increasing the set number of pixels which will trigger the setting of the threshold value $F_H$, these individual dark pixels will be ignored, thereby preventing the threshold value $F_H$ from being set too low.

$F_H$ is then compared with $F_{max}$, which represents a predetermined amount of flare correction which should be made. For most images, $F_H$ will be the smaller value. $F_{max}$ is set at a level which will prevent over-correction of particularly bright scenes containing very low black levels, such as an image of a white wall. The smaller of $F_H$ and $F_{max}$ is used as the estimated flare value F in the grayscale processing equation 1 or RGB processing equations 6-8.

Figure 4A:
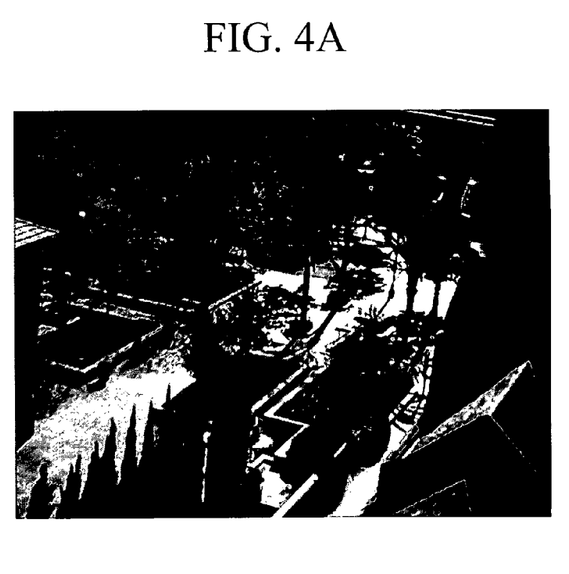
FIG. 4A is the exemplary image of FIG. 3A after a flare correction according to the present invention.
Figure 4B:
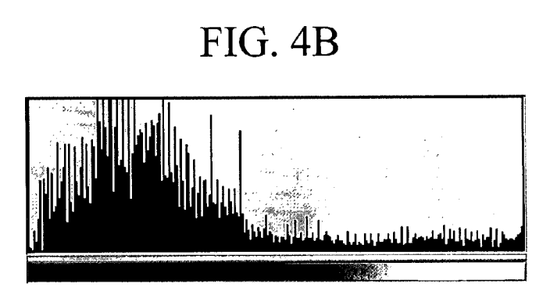
FIG. 4B is a histogram of the exemplary image of FIG. 4A.

After applying the image processing equations 1 or 6-8 on each pixel signal, the outputted image, shown in FIG. 4A, will have contrast and white levels at or near the levels of the correct image shown in FIG. 2A. The histogram shown in FIG. 4B of the image of FIG. 4A will thus resemble the histogram of FIG. 2B. When capturing a sequence of consecutive images, such as in a video stream, F should vary slowly over time, so as to avoid dramatic changes in contrast from frame to frame. If the consecutive images depict the same scene under same illumination conditions, the value of F can be estimated from a previous frame and is applied to the next one. When flare cancellation is used with real-time video processing the change in the value of F from frame to frame can be limited to a predetermined value so that F changes slowly over time. This ensures that image contrast and brightness will not make sudden jumps from frame to frame. Alternatively, when the method is used on a single image, the value of F can be calculated based on a predetermined source image and then is applied to the image.

Figure 5A:
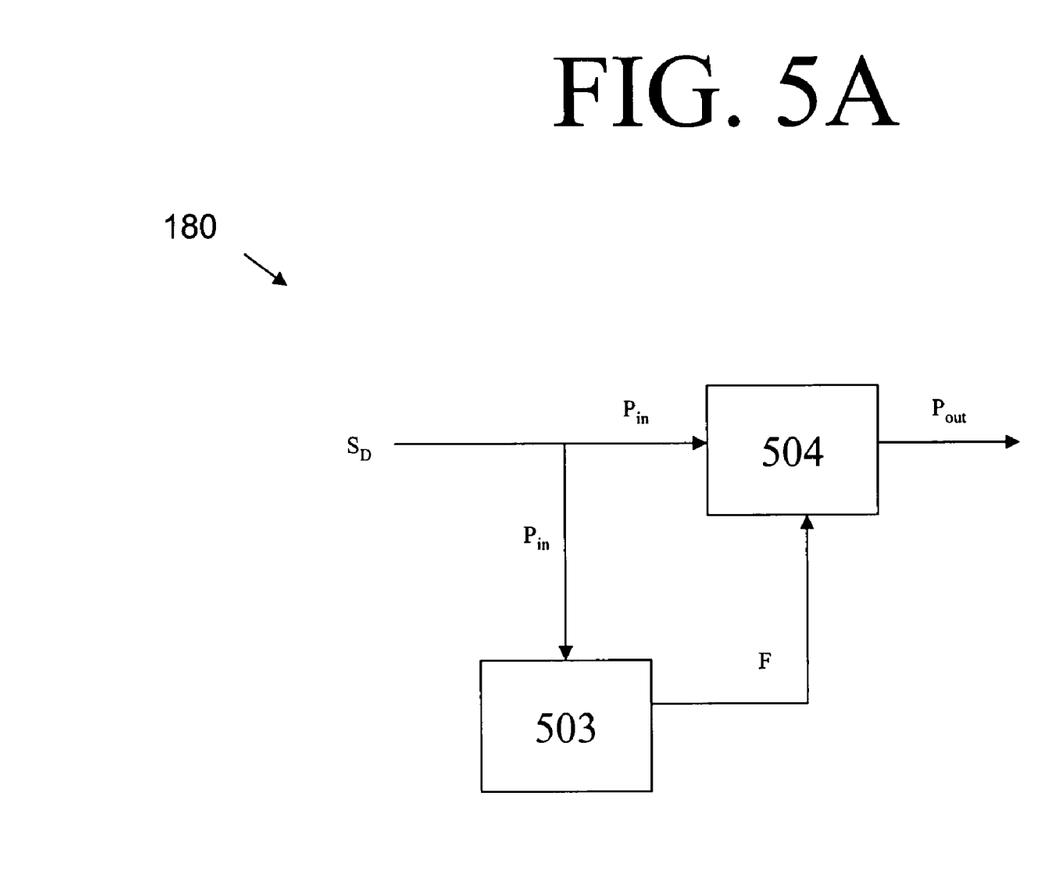
FIG. 5A depicts a block diagram of components of an image processor according to the present invention.

An exemplary portion of a grayscale image processor 180 containing an embodiment of the present invention is shown in FIG. 5A. The image processor 180 includes a histogram unit 503 for generating the histogram and providing an F value, representing the smaller of $F_H$ and $F_{max}$ vaues, for each pixel of an image, and a flare correction unit 504 which calculates the new pixel outputs using equation 1 above. Digitized pixel signals $S_D$ enter image processor 180 and is routed to both the histogram unit 503 and the flare correction unit 504. $P_{out}$ is then output from the image processor 180 as a fully formed digital image.

Figure 5B:
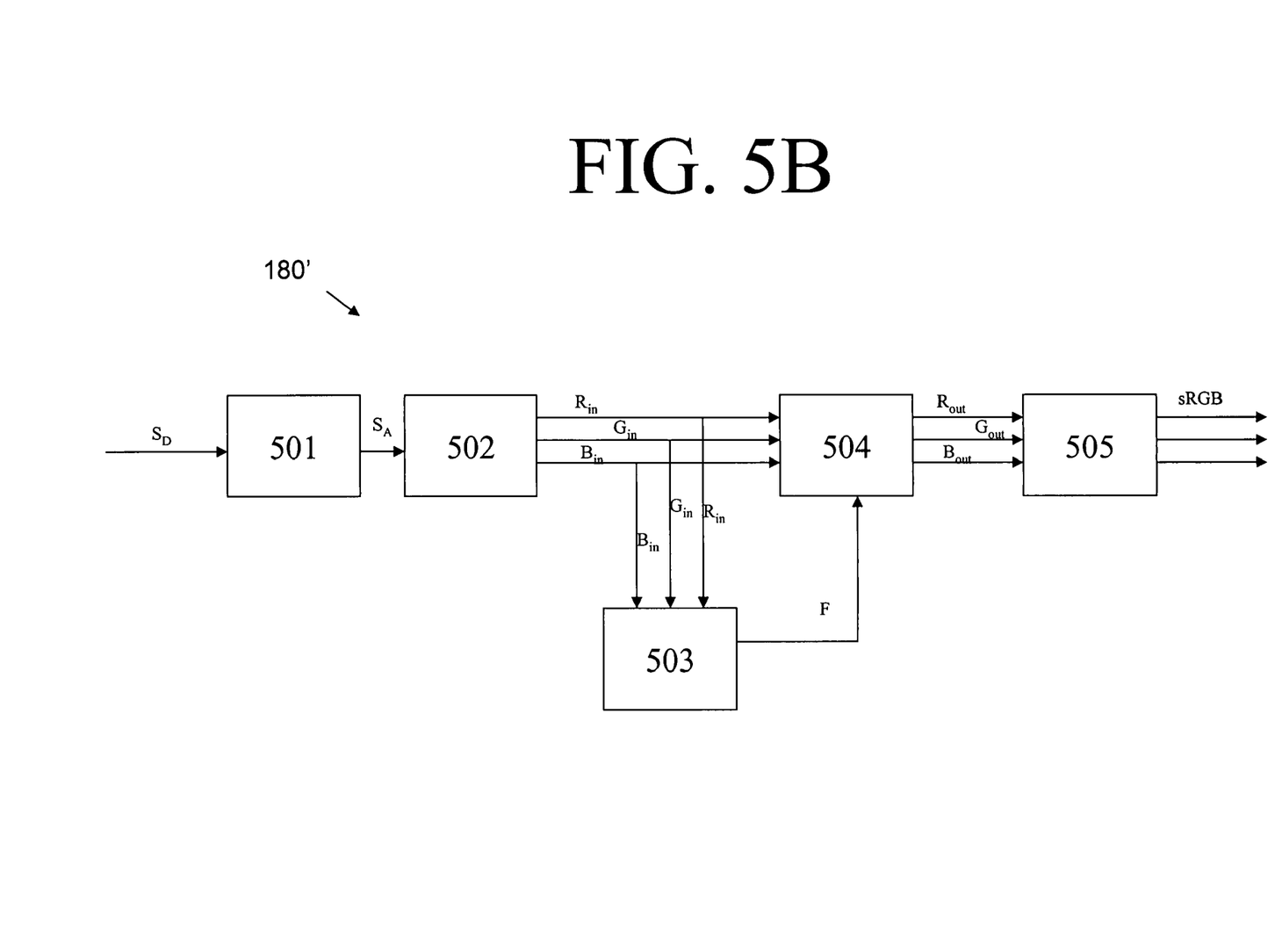
FIG. 5B depicts a block diagram of components of another image processor according to the present invention and FIG. 6 depicts a block diagram of a processor system containing at least one imaging device constructed in accordance with an embodiment of the invention.

An exemplary portion of an RGB image processor 180' containing another embodiment of the present invention is shown in FIG. 5B. The image processor 180' includes gain unit 501, demosaic unit 502, histogram unit 503, flare correction unit 504 and color correction unit 505. Digitized pixel signals $S_D$ enter image processor 180' and are amplified using gain unit 501. The amplified signals $S_A$ are transmitted to demosaic unit 502 where each pixel signal is assigned an R, G, and B signal according to the arrangement of color filters in the pixel array 140, e.g., a Bayer RGB arrangement, and according to an algorithm employed by the demosaic unit 502. The RGB signals ($R_{in}$, $G_{in}$, $B_{in}$) are routed to histogram unit 503 and flare correction unit 504. The histogram unit 503 generates a histogram of the image data, calculates $F_H$ using the generated histogram, and outputs the smaller of $F_H$ and $F_{max}$ to the flare correction unit 504.

The flare correction unit 504 calculates the values of the RGB outputs ($R_{out}$, $G_{out}$ and $B_{out}$) for each pixel, based on $R_{in}$, $G_{in}$, $B_{in}$ for each pixel, received from the demosaic unit 502 and F received from the histogram unit 503, and using equations 6-8, discussed in detail above. The RGB output is then processed in a color correction unit 505 and output from the image processor 180' as a fully formed digital image (sRGB).

Figure 6:
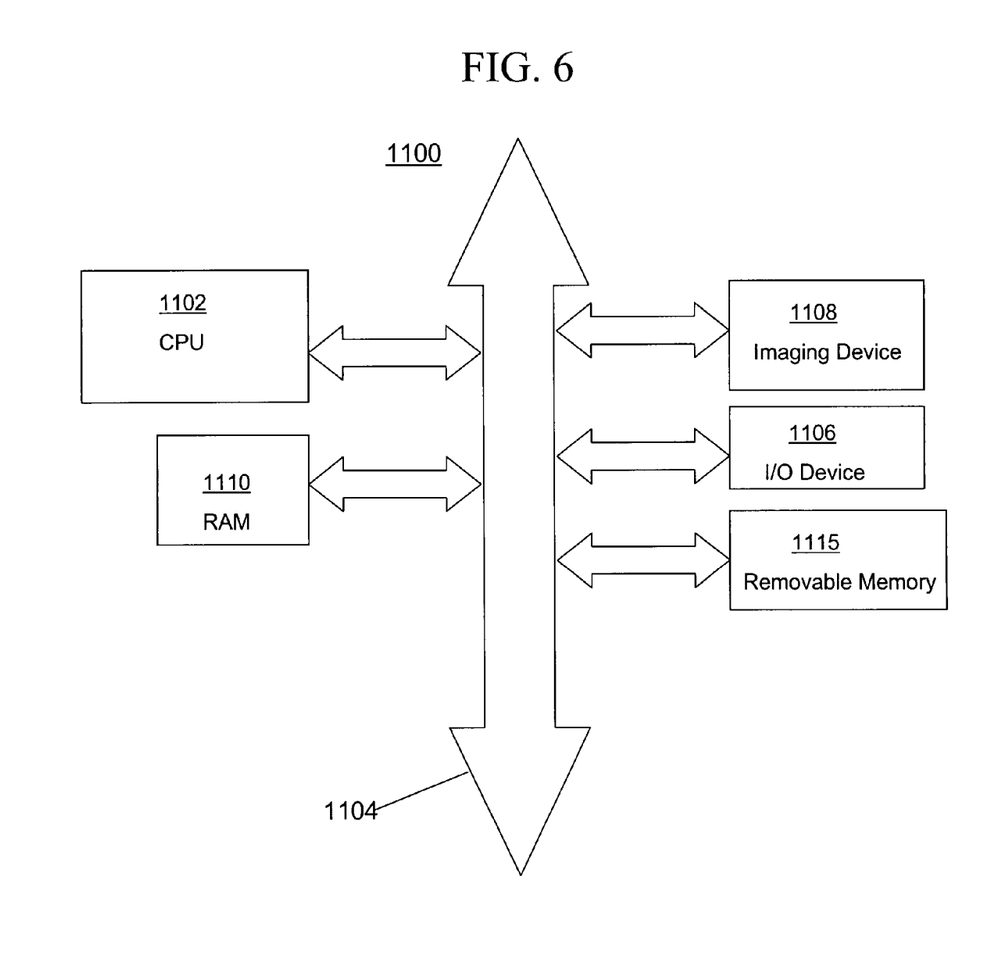

FIG. 6 illustrates a processor system 1100 including an imaging device 1108, which may include an image processor 180 (FIGS. 1B and 5), performing the method of the invention. The processor system 1100 is exemplary of a system having digital circuits that could include image sensor devices. Without being limiting, such a system could include a computer system, camera system, scanner, machine vision, vehicle navigation, video phone, surveillance system, auto focus system, star tracker system, motion detection system, image stabilization system, and other image augmentation and processing systems.

The processor system 1100, for example a camera system, generally comprises a central processing unit (CPU) 1102, such as a microprocessor, that communicates with an input/output (I/O) device 1106 over a bus 1104. Imaging device 1108 also communicates with the CPU 1102 over the bus 1104, and may include the image processor 180 as discussed above with respect to FIG. 5. The system 1100 also may include random access memory (RAM) 1110, and can include removable memory 1115, such as flash memory, which also communicates with CPU 1102 over the bus 1104.

Imaging device 1108 may be combined with a processor, such as a CPU, digital signal processor, or microprocessor, with or without memory storage on a single integrated circuit or on a different chip than the processor. Any of the memory storage devices in the processor-based system 1100 could store software for employing the method of the invention.

The acts of producing an output image in accordance with the processes described and illustrated with reference to FIGS. 5A and 5B may be conducted by the image processor 180 or by the CPU 1102, or by yet another processor communicating with system 1100. Further, a program capable of performing some or all of the processes described and illustrated with respect to FIGS. 5A and 5B may be stored on a computer storage medium. The processes described and illustrated with reference to FIGS. 5A and 5B may be conducted on any stored digital image at any point, including, for example, performing the processes within a commercial image editing computer program, e.g., Adobe® Photoshop®. It should also be noted that although the invention has also been described with respect to CMOS and CCD imagers, the invention is not so limited. For example, the invention could be applied to various types of imager devices.

The above description and drawings illustrate preferred embodiments which achieve the objects, features, and advantages of the present invention. Although certain advantages and preferred embodiments have been described above, those skilled in the art will recognize that substitutions, additions, deletions, modifications and/or other changes may be made without departing from the spirit or scope of the invention. Accordingly, the invention is not limited by the foregoing description but is only limited by the scope of the appended claims.

What is claimed as new and desired to be protected by Letters Patent of the United States is:

1. A method of processing an image from an image sensor, said method comprising the acts of:

generating in an image processor a histogram of numbers of pixels from the image that correspond to possible pixel response values of the pixels of the image and generating an adjustment signal having a luminance adjustment value responsive to said histogram by determining in said histogram a pixel response value below which there are no pixel counts which exceed a predetermined pixel count of zero pixels or more, and using a threshold value associated with that location as said adjustment signal; and using the image processor to adjust the pixel response values of the pixels of said image responsive to the adjustment signal to produce an adjusted image.

2. The method of claim 1, wherein said act of generating an adjustment signal includes comparing said threshold value to a predetermined maximum adjustment value, wherein said luminance adjustment value of the adjustment signal is set as the smaller of said threshold value and said maximum adjustment value.

3. The method of claim 1, wherein a pixel output value is assigned to each pixel of the image according to the following formula:

$$P_{out} = \frac{(P_{in} - F)}{(K - F)}$$

wherein K is an empirical constant, $P_{in}$ represents the pixel response value of the pixel, $P_{out}$ represents the pixel output value, and F represents the luminance adjustment value of the adjustment signal.

4. The method of claim 1, wherein each pixel comprises a red, blue and green pixel response value and a red, blue and green pixel output value is assigned to the respective red, blue and green pixel response value of each pixel of an image according to the following formulas:

$$R_{out} = \frac{(R_{in} - F)}{(K - F)}$$

$$G_{out} = \frac{(G_{in} - F)}{(K - F)}$$

$$B_{out} = \frac{(B_{in} - F)}{(K - F)}$$

wherein K is an empirical constant, $R_{in}$ represents the red pixel response value of the pixel, $G_{in}$ represents the green pixel response value of the pixel, $B_{in}$ represents the blue pixel response value of the pixel, $R_{out}$ represents the red pixel output value, $G_{out}$ represents the green pixel output value, $B_{out}$ represents the blue pixel output value, and F represents the luminance adjustment value of the adjustment signal.

5. An image processor comprising:

a flare detection circuit for generating a histogram of numbers of pixels from an image that correspond to possible pixel response values of the pixels of the image and generating an adjustment signal having a luminance adjustment value responsive to said histogram by determining in said histogram a pixel response value below which there are no pixel counts which exceed a predetermined pixel count of zero pixels or more, and using a threshold value associated with that location as said adjustment signal; and an adjustment circuit connected to the flare detection circuit for adjusting the pixel response values of the pixels of said image responsive to the adjustment signal to produce an adjsted image.

6. The image processor of claim 5, wherein said flare detection circuit is further configured to generate said adjustment signal by comparing said threshold value to a predetermined maximum adjustment value, wherein said luminance adjustment value of the adjustment signal is set as the smaller of said threshold value and said maximum adjustment value.

7. The image processor of claim 5, wherein said adjustment circuit is configured to assign a pixel output value to each pixel of an image according to the following formula:

$$P_{out} = \frac{(P_{in} - F)}{(K - F)}$$

wherein K is an empirical constant, $P_{in}$ represents the pixel response value of the pixel, $P_{out}$ represents the pixel output value, and F represents the luminance adjustment value of the adjustment signal.

8. The image processor of claim 5, wherein each pixel comprises a red, blue and green pixel response value and said adjustment circuit is configured to assign a red, blue and green pixel output value to the respective red, blue and green pixel response value of each pixel of an image according to the following formulas:

$$R_{out} = \frac{(R_{in} - F)}{(K - F)}$$

$$G_{out} = \frac{(G_{in} - F)}{(K - F)}$$

$$B_{out} = \frac{(B_{in} - F)}{(K - F)}$$

wherein K is an empirical constant, $R_{in}$ represents the red pixel response value of the pixel, $G_{in}$ represents the green pixel response value of the pixel, $B_{in}$ represents the blue pixel response value of the pixel, $R_{out}$ represents the red pixel output value, $G_{out}$ represents the green pixel output value, $B_{out}$ represents the blue pixel output value, and F represents the luminance adjustment value of the adjustment signal.

9. An imager comprising:

an array of pixels, each pixel having a pixel response value; and an image processor connected to said array, said image processor comprising:

a flare detection circuit for generating a histogram of numbers of pixels from an image that correspond to possible pixel response values of said pixels and generating an adjustment signal having a luminance adjustment value responsive to said histogram by determining in said histogram a pixel response value below which there are no pixel counts which exceed a predetermined pixel count of zero pixels or more, and using a threshold value associated with that location as said adjustment signal; and an adjustment circuit connected to the flare detection circuit for adjusting the pixel response values of said pixels of said image responsive to the adjustment signal to produce an adjsted image.

10. The imager of claim 9, wherein said flare detection circuit is further configured to generate said adjustment signal by comparing said threshold value to a predetermined maximum adjustment value, wherein said luminance adjustment value of the adjustment signal is set as the smaller of said threshold value and said maximum adjustment value.

11. The imager of claim 9, wherein said adjustment circuit is configured to assign a pixel output value to each pixel of an image according to the following formula:

$$P_{out} = \frac{(P_{in} - F)}{(K - F)}$$

wherein K is an empirical constant, $P_{in}$ represents the pixel response value of the pixel, $P_{out}$ represents the pixel output value, and F represents the luminance adjustment value of the adjustment signal.

12. The imager of claim 9, wherein each pixel comprises a red, blue and green pixel response value and said adjustment circuit is configured to assign a red, blue and green pixel output value to the respective red, blue and green pixel response value of each pixel of an image according to the following formulas:

$$R_{out} = \frac{(R_{in} - F)}{(K - F)}$$

$$G_{out} = \frac{(G_{in} - F)}{(K - F)}$$

$$B_{out} = \frac{(B_{in} - F)}{(K - F)}$$

wherein K is an empirical constant, $R_{in}$ represents the red pixel response value of the pixel, $G_{in}$ represents the green pixel response value of the pixel, $B_{in}$ represents the blue pixel response value of the pixel, $R_{out}$ represents the red pixel output value, $G_{out}$ represents the green pixel output value, $B_{out}$ represents the blue pixel output value, and F represents the luminance adjustment value of the adjustment signal.

13. An imaging system comprising:

a processor;

an imager connected to the processor, said imager comprising:

an array of pixels, each pixel having a pixel response value; and an image processor connected to said array, said image processor comprising:

a flare detection circuit for generating a histogram of numbers of pixels from an image that correspond to possible pixel response values of said pixels and generating an adjustment signal having a luminance adjustment value responsive to said histogram by determining in said histogram a pixel response value below which there are no pixel counts which exceed a predetermined pixel count of zero pixels or more, and using a threshold value associated with that location as said adjustment signal; and an adjustment circuit connected to the flare detection circuit for adjusting the pixel response values of said pixels of said image responsive to the adjustment signal to produce an adjusted image.

14. The imaging system of claim 13, wherein said flare detection circuit is further configured to generate said adjustment signal by comparing said threshold value to a predetermined maximum adjustment value, wherein said luminance adjustment value of the adjustment signal is set as the smaller of said threshold value and said maximum adjustment value.

15. The imaging system of claim 13, wherein said adjustment circuit is configured to assign a pixel output value to each pixel of an image according to the following formula:

$$P_{out} = \frac{(P_{in} - F)}{(K - F)}$$

wherein K is an empirical constant, $P_{in}$ represents the pixel response value of the pixel, $P_{out}$ represents the pixel output value, and F represents the luminance adjustment value of the adjustment signal.

16. The imaging system of claim 13, wherein each pixel comprises a red, blue and green pixel response value and said adjustment circuit is configured to assign a red, blue and green pixel output value to the respective red, blue and green pixel response value of each pixel of an image according to the following formulas:

$$R_{out} = \frac{(R_{in} - F)}{(K - F)}$$

$$G_{out} = \frac{(G_{in} - F)}{(K - F)}$$

$$B_{out} = \frac{(B_{in} - F)}{(K - F)}$$

wherein K is an empirical constant, $R_{in}$ represents the red pixel response value of the pixel, $G_{in}$ represents the green pixel response value of the pixel, $B_{in}$ represents the blue pixel response value of the pixel, $R_{out}$ represents the red pixel output value, $G_{out}$ represents the green pixel output value, $B_{out}$ represents the blue pixel output value, and F represents the luminance adjustment value of the adjustment signal.

17. A non-transitory computer storage medium comprising:

a computer program stored on said computer storage medium, said computer program configured to perform the acts of:

generating a histogram of numbers of pixels from an image that correspond to possible pixel response values of the pixels of the image and generating an adjustment signal having a luminance adjustment value responsive to said histogram by determining in said histogram a pixel response value below which there are no pixel counts which exceed a predetermined pixel count of zero pixels or more, and using a threshold value associated with that location as said adjustment signal; and adjusting the pixel response values of the pixels of said image responsive to the adjustment signal to produce an adjusted image.

18. The non-transitory computer storage medium of claim 17, wherein said act of generating an adjustment signal includes comparing said threshold value to a predetermined maximum adjustment value, wherein said luminance adjustment value of the adjustment signal is set as the smaller of said threshold value and said maximum adjustment value.

19. The non-transitory computer storage medium of claim 17, wherein a pixel output value is assigned to each pixel of an image according to the following formula:

$$P_{out} = \frac{(P_{in} - F)}{(K - F)}$$

wherein K is an empirical constant, $P_{in}$ represents the pixel response value of the pixel, $P_{out}$ represents the pixel output value, and F represents the luminance adjustment value of the adjustment signal.

20. The non-transitory computer storage medium of claim 17, wherein each pixel comprises a red, blue and green pixel response value and a red, blue and green pixel output value is assigned to the respective red, blue and green pixel response value of each pixel of an image according to the following formulas:

$$R_{out} = \frac{(R_{in} - F)}{(K - F)}$$

$$G_{out} = \frac{(G_{in} - F)}{(K - F)}$$

$$B_{out} = \frac{(B_{in} - F)}{(K - F)}$$

wherein K is an empirical constant, $R_{in}$ represents the red pixel response value of the pixel, $G_{in}$ represents the green pixel response value of the pixel, $B_{in}$ represents the blue pixel response value of the pixel, $R_{out}$ represents the red pixel output value, $G_{out}$ represents the green pixel output value, $B_{out}$ represents the blue pixel output value, and F represents the luminance adjustment value of the adjustment signal.

* * * * *